J. M. REID.
Process for Curing Meats.
No. 221,357. Patented Nov. 4, 1879.
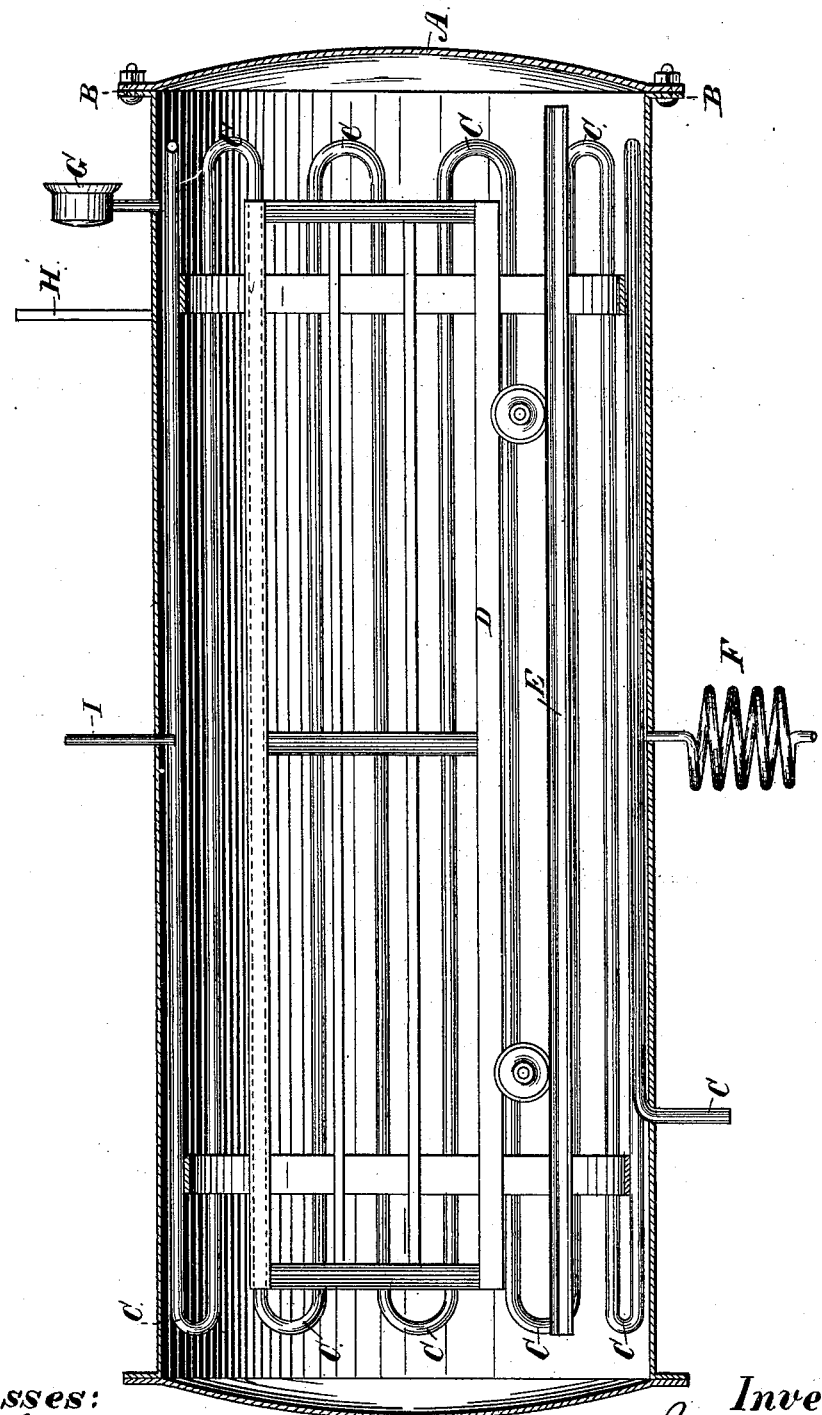
Witnesses:
Henry Eichling
B. G. Clark
Inventor:
J. Mowat Reid

UNITED STATES PATENT OFFICE.

J. MOWAT REID, OF MONCTON, CANADA.

IMPROVEMENT IN PROCESSES FOR CURING MEATS.

Specification forming part of Letters Patent No. 221,357, dated November 4, 1879; application filed February 1, 1879.

*To all whom it may concern:*

Be it known that I, JOHN MOWAT REID, of Moncton, Canada, have invented a new and useful method or process for curing or preserving the flesh of animals to be used for food, of which the following is a specification.

As decomposition commences in the bodies of animals very quickly after life is extinct, it is necessary, in order to preserve undeteriorated those intended for human food, that the preserving process should be one which will prevent, or quickly arrest, all decomposition with as little chemical or structural change as possible, and the use of the least possible amount of foreign agents, such as salt, &c.

The object of my invention is to accomplish the above-named result; and it consists in the method of preserving flesh of animals intended for human food, by subjecting it to the action, in a close vessel or receiver, of hot compressed air, whereby the flesh is quickly both dried and compressed, and thus thoroughly cured, as hereinafter described and claimed.

The flesh to be cured by my process may be prepared in the ordinary way, as desired, and cut into pieces of convenient size. Fish should be opened and thoroughly cleansed. I preferably apply a small amount of salt or other antiseptic, or put the fish for a suitable time into a moderately-salt brine. I then put them into a close vessel or receiver (an apparatus is hereinafter described and shown in the accompanying drawings, which may be employed for the purpose) into which air is forced and thereby compressed. The air is also heated. For fish a temperature of from 90° to 100° Fahrenheit, and an atmospheric pressure of twenty-five to thirty pounds to the inch are preferable. For beef and similar meats, a higher temperature, say, 150° Fahrenheit, and pressure, say, forty to fifty pounds to the inch, may be employed.

The best results are obtained by the temperatures and pressures above named, but I do not intend to be limited precisely to them. The object being to quickly desiccate and compress the meat, a degree of heat should not be employed that will defeat this object.

The air in the receiver may be heated either by applying heat to the outside of the receiver, or, preferably, by pipes within the receiver heated by steam. By means of a common air-pump connected with the receiver the desired pressure can be given to the air in it.

When flesh is thus subjected to the action of hot air under pressure in the manner described, the larger part of the fluids in it are quickly expelled, and such portions of these fluids as assume the form of vapor may be condensed and drawn off, so as to keep the air dry, by means of a suitable condensing apparatus connected with the receiver.

Cod, haddock, pollock, and similar fish may be thus cured with a temperature, as before stated, of from 100° to 120° Fahrenheit, and a pressure of about thirty pounds to the square inch.

I find that animal food cured in the manner described requires only very little salt or its equivalent for its preservation, and some kinds of fish may be thus cured without salting at all. It is more palatable and nutritious than flesh cured by salt, or drying in the ordinary way.

In salting cod-fish and large pieces of beef, preparatory to treatment by heat under pressure, in order that the salt may quickly penetrate the whole mass, I prefer to place them in brine or its equivalent, under a pressure of from fifty to sixty pounds per square inch for a short time. Haddock from five to fifteen minutes, cod-fish from thirty to sixty minutes, and beef and similar flesh from one to two hours.

This method of salting meat I believe to be new; but I do not in this specification make a claim for it, reserving such claim for a separate application for a patent for a process which I file simultaneously with the present one.

The following is a description of an apparatus by which my curing process may be practiced, referring to the accompanying drawing. The said drawing, a single figure, represents a central longitudinal section of a large cylinder made air-tight, closed with a fixed head at one end, and having at the opposite end a removable head, A, properly secured to the cylinder, with an air-tight joint, by bolts, as shown, or otherwise. Preferably these bolts pass through slots in the edge of the flange B and said head, so that they may be removed from the slots by simply starting back the nuts, and thus the head is taken off and put in more readily than if the bolts passed through holes in the head and flange. Around the interior walls of the cylinder is a coil of steam-pipe, C. This pipe is represented in the drawing as running lengthwise of the cylinder, bent back upon itself at the ends. It may, if preferred, be made in the form of a helical coil around the inside of the cylinder. Steam is to be supplied to this pipe for heating the air in the cylinder from any suitable steam-generator.

In the drawing is also shown a truck or carriage, D, made to run on a track, E. This track is intended to connect with a corresponding track outside the cylinder, so that the truck may be loaded with meat outside on the track and then conveniently run into the cylinder.

F is a coil of pipe the upper end of which opens into the cylinder. The lower end is to be provided with a valve which may be opened at pleasure, so as to let the contents of the coil escape. This coil is to be kept cold by being placed in a tub having cold water running through it. It will then act as a condenser of the vapor that may be formed by the heat in the cylinder.

G is a pressure-gage, to indicate the atmospheric pressure in the cylinder; H, a thermometer, to indicate the degree of heat therein; and I is a pipe leading into the cylinder, through which air may be forced into the cylinder by any suitable air-pump.

The valve in the condenser F may be kept closed until the coil is filled with water by condensation of vapor, when it may be opened and the water allowed to escape.

In practicing the common method of curing meat, whether by salting or drying, or both, a considerable time necessarily elapses after the commencement of the drying, or the application of the salt, before the full effect of the antiseptic agent employed is produced throughout the mass of the meat, and during this time incipient putrefaction, to a greater or less extent, takes place.

By my process, the antiseptic effect is almost instantaneous, thus altogether preventing decomposition, and the fermentation of the natural juices of the meat when the meat is submitted to treatment immediately after life is extinct, and immediately arresting decomposition, if it has commenced. Deterioration of the quality is thereby obviated.

What I claim, and desire to secure by Letters Patent, is—

The method herein described of curing the flesh of animals, consisting in drying and compressing it in an air-tight receptacle by the application of heated compressed air, as specified.

J. MOWAT REID.

Witnesses:
M. F. CLIFTON,
I. P. FITCH.